United States Patent
Ikuyama et al.

(10) Patent No.: US 9,811,486 B2
(45) Date of Patent: Nov. 7, 2017

(54) PROGRAMMABLE CONTROLLER

(71) Applicant: Mitsubishi Electric Corporation, Tokyo (JP)

(72) Inventors: Tomo Ikuyama, Tokyo (JP); Junji Yamamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 146 days.

(21) Appl. No.: 14/899,584

(22) PCT Filed: Jun. 25, 2013

(86) PCT No.: PCT/JP2013/067403
§ 371 (c)(1),
(2) Date: Dec. 18, 2015

(87) PCT Pub. No.: WO2014/207825
PCT Pub. Date: Dec. 31, 2014

(65) Prior Publication Data
US 2016/0147682 A1    May 26, 2016

(51) Int. Cl.
*G06F 13/42* (2006.01)
*G06F 1/12* (2006.01)
(Continued)

(52) U.S. Cl.
CPC ........... *G06F 13/362* (2013.01); *G05B 19/05* (2013.01); *G06F 13/4278* (2013.01)

(58) Field of Classification Search
None
See application file for complete search history.

(56) References Cited

U.S. PATENT DOCUMENTS 3,866,442 A * 2/1975 Kouril .................... D04B 15/78
                                                        322/4
4,384,307 A * 5/1983 Kuzmik ............. H04N 1/32566
                                                        348/552
(Continued)

FOREIGN PATENT DOCUMENTS

EP        1 014 271 B1    9/2006
JP        11-205392 A     7/1999
(Continued)

OTHER PUBLICATIONS

Taiwanese Office Action for TW 102145512 dated Feb. 25, 2015.
(Continued)

*Primary Examiner* — Hyun Nam
(74) *Attorney, Agent, or Firm* — Sughrue Mion, PLLC; Richard C. Turner (57) ABSTRACT

A programmable controller according to an embodiment includes: a bus for data transmission and reception; a synchronous-control signal line that transmits a synchronous control signal; a synchronous-control-signal generating unit that is connected to the synchronous-control signal line and generates the synchronous control signal on a basis of an external signal; a data holding unit that is connected to the bus and the synchronous-control signal line and latches a signal from an external device in an internal memory in synchronization with the synchronous control signal; and a CPU unit that is connected to the bus and the synchronous-control signal line and reads a value in the internal memory via the bus in synchronization with the synchronous control signal.

3 Claims, 5 Drawing Sheets

(51) Int. Cl.
*G06F 13/362* (2006.01)
*G05B 19/05* (2006.01)

(56) References Cited

U.S. PATENT DOCUMENTS

| | | | | |
|---|---|---|---|---|
| 8,024,584 | B2 * | 9/2011 | Birmingham | G06F 1/266 455/74 |
| 2002/0106110 | A1 * | 8/2002 | Vega | G01P 5/001 382/107 |
| 2012/0004886 | A1 * | 1/2012 | Jordil | G01B 7/287 702/150 |
| 2013/0254584 | A1 * | 9/2013 | Tamaoki | G05B 19/05 713/401 |

FOREIGN PATENT DOCUMENTS

| | | |
|---|---|---|
| JP | 2005-243008 A | 9/2005 |
| JP | 2005-309627 A | 11/2005 |
| JP | 2006-236089 A | 9/2006 |
| JP | 2009-181443 A | 8/2009 |
| TW | 201227192 A1 | 7/2012 |
| WO | 2012/081115 A1 | 6/2012 |
| WO | 2012/098676 A1 | 7/2012 |

OTHER PUBLICATIONS

Japanese Notice of Rejection for JP 2013-556446 dated Feb. 3, 2014.
International Search Report for PCT/JP2013/067403 dated Sep. 24, 2013.
Communication dated Jul. 8, 2014 from the Japanese Patent Office issued in corresponding Application No. 2013-556446.
Communication dated Mar. 1, 2017 from the State Intellectual Property Office of the P.R.C. in counterpart Chinese application No. 201380077714.6.

* cited by examiner

PROGRAMMABLE CONTROLLER

CROSS REFERENCE TO RELATED APPLICATIONS

This application is a National Stage of International Application No. PCT/JP2013/067403 filed Jun. 25, 2013, the contents of which are incorporated herein by reference in their entirety.

FIELD

The present invention relates to a programmable controller that is synchronous with a synchronous control signal.

BACKGROUND

A counter unit constituting a programmable controller connects to an external device, such as an encoder, counts pulses input from the external device, and stores the current count value in an internal memory.

A CPU unit outputs a synchronous control signal with a constant period to the counter unit. Upon receiving the synchronous control signal, the counter unit latches the current count value of the pulses input from the external device, such as an encoder, in the internal memory.

In this way, the timing at which the counter unit latches the current count value in the internal memory is synchronized with the timing at which the CPU unit starts to execute a program. Thus, the current count value with a stable constant period can be obtained.

CITATION LIST

Patent Literatures

Patent Literature 1: Japanese Patent Application Laid-open No. 2005-309627
Patent Literature 2: Japanese Patent Application Laid-open No. H11-205392
Patent Literature 3: Japanese Patent Application Laid-open No. 2005-243008
Patent Literature 4: Japanese Patent Application Laid-open No. 2009-181443

SUMMARY

Technical Problem

A counter unit can obtain information, such as the current position of a workpiece, by obtaining the current count value. Accordingly, stable data can be obtained by performing synchronous control in combination with other units in a programmable controller.

However, in a conventional counter unit, only a signal that is output from a CPU unit and generated repeatedly with a constant period can be selected as the synchronous control signal. Thus, synchronous control cannot be executed at an arbitrary timing. Consequently, for example, when the speed of movement of a workpiece is not constant, a conventional system in which only a signal with a constant period can be used as the synchronous control signal has a problem in that the thicknesses at evenly spaced positions of the workpiece cannot be obtained.

The present invention has been achieved in view of the above problems, and an object of the present invention is to provide a programmable controller capable of executing control that cannot be realized by a system using a signal with a constant period as a synchronous control signal, for example, a programmable controller that can obtain the thicknesses at evenly spaced positions of a workpiece even when the speed of movement of the workpiece is not constant.

Solution to Problem

In order to solve the above problems and achieve the object, an aspect of the present invention is a programmable controller including: a bus for data transmission and reception; a synchronous-control signal line that transmits a synchronous control signal; a synchronous-control-signal generating unit that is connected to the synchronous-control signal line and generates the synchronous control signal on a basis of an external signal; a data holding unit that is connected to the bus and the synchronous-control signal line and latches a signal from an external device in an internal memory in synchronization with the synchronous control signal; and a CPU unit that is connected to the bus and the synchronous-control signal line and reads a value in the internal memory via the bus in synchronization with the synchronous control signal.

Advantageous Effects of Invention

A programmable controller according to the present invention can execute synchronous control at a timing most suitable for a system including a timing according to an external operation. That is, an effect is obtained where synchronous control for operating units in the programmable controller at the same timing in response to an external input (a variable period signal) can be executed.

DESCRIPTION OF EMBODIMENTS

A programmable controller according to embodiments of the present invention will be explained below in detail with reference to the drawings. The present invention is not limited to the embodiments.

First Embodiment

Figure 1:
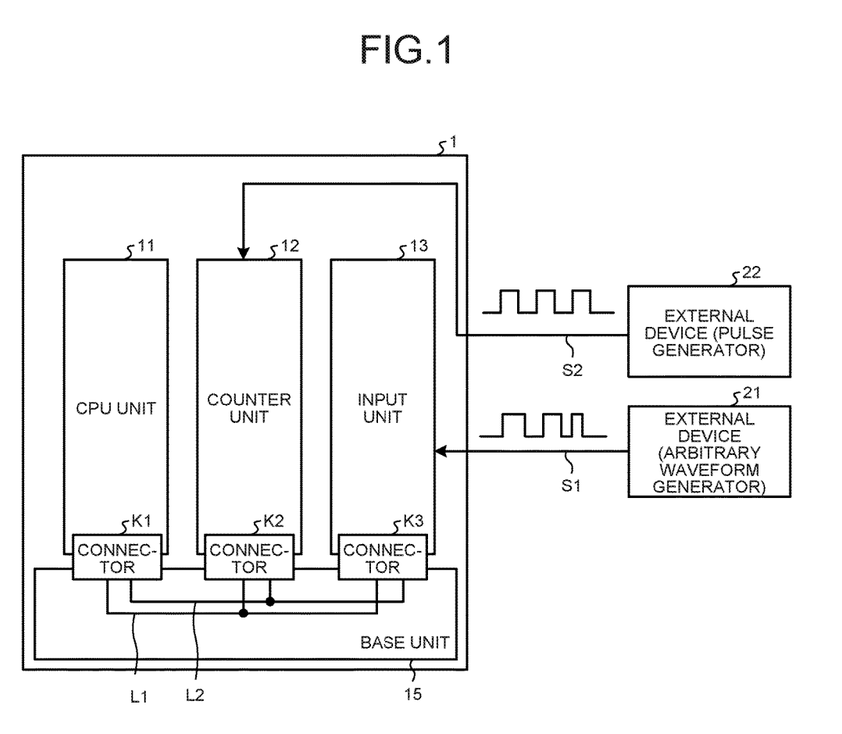
FIG. 1 is a diagram illustrating a configuration of a programmable controller according to a first embodiment.

FIG. 1 is a diagram illustrating a configuration of a programmable controller 1, which is a control device, according to a first embodiment of the present invention. As illustrated in FIG. 1, the programmable controller 1 according to the embodiment of the present invention includes four units: a CPU unit 11; a counter unit 12, which is a data holding unit; an input unit 13, which is a synchronous-control-signal generating unit; and a base unit 15.

The base unit 15 includes a bus communication line L1 for transmitting and receiving data among the units and a synchronous-control signal line L2 that transmits a synchronous control signal. The base unit 15 includes connectors K1 to K3 on the front side of the plate surface portion connected to the units. The base unit 15 is connected to the CPU unit 11, the counter unit 12, and the input unit 13 via the connector K1, the connector K2, and the connector K3, respectively.

As illustrated in FIG. 1, in the programmable controller 1, the input unit 13 receives an arbitrary signal waveform S1 from an external device 21 and supplies a synchronous control signal with an arbitrary period to the synchronous-control signal line L2 on the basis of the signal waveform S1. The counter unit 12 latches and holds therein the current count value, which is a pulse integrated value of a pulse S2 input from an external device 22, in synchronization with the synchronous control signal passing through the synchronous-control signal line L2 on the base unit 15. That is, the current count value is an integrated value of the number of pulses input from the external device 22, such as an encoder, to the counter unit 12. The CPU unit 11 also executes program processing in synchronization with the synchronous control signal passing through the synchronous-control signal line L2. In the program processing, the CPU unit 11 reads the current count value stored in the internal memory of the counter unit 12 with the use of a program instruction.

Figure 2:
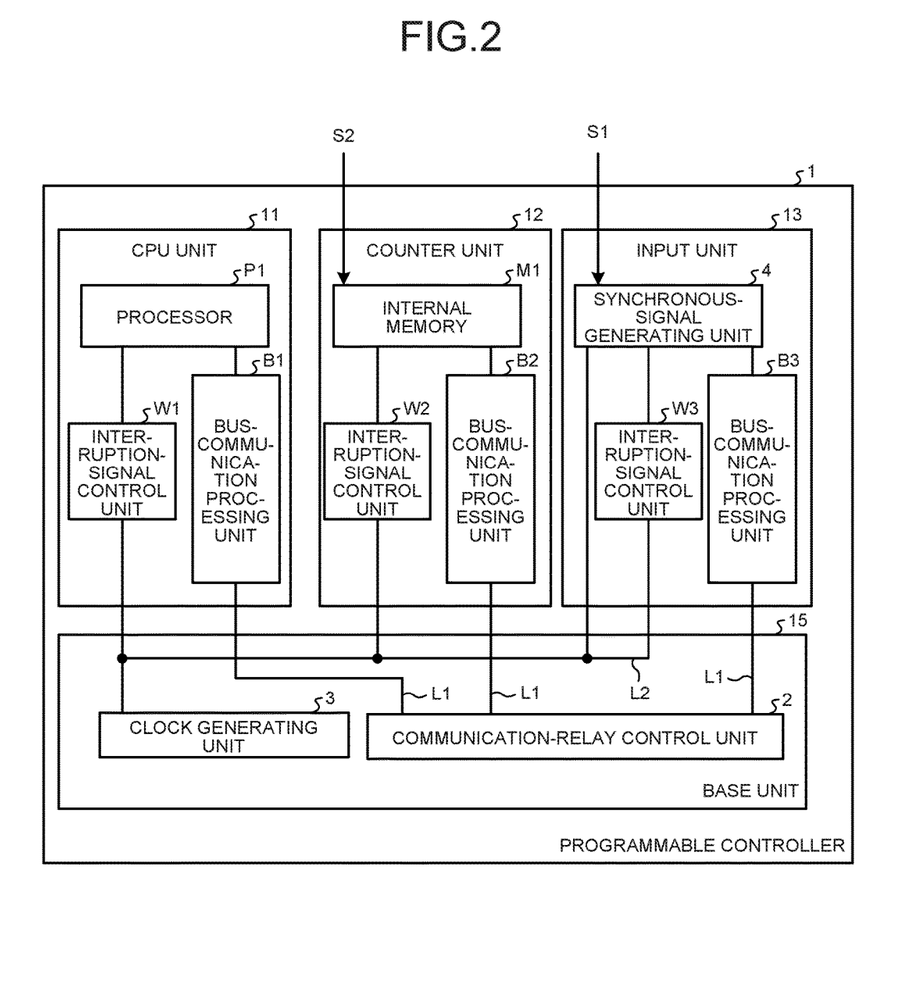
FIG. 2 is a block diagram illustrating a detailed configuration of the programmable controller according to the first embodiment.

FIG. 2 is a block diagram illustrating a detailed configuration of the programmable controller 1 according to the first embodiment. As described above, the programmable controller 1 includes the CPU unit 11, the counter unit 12, the input unit 13, and the base unit 15.

Each of the CPU unit 11, the counter unit 12, and the input unit 13 is connected to the synchronous-control signal line L2 for transmitting the synchronous control signal and the bus communication line L1 for transmitting and receiving data. The synchronous-control signal line L2 and the bus communication line L1 are included in the base unit 15. The CPU unit 11, the counter unit 12, and the input unit 13 include interruption-signal control units W1 to W3 that have functions of receiving the synchronous control signal via the synchronous-control signal line L2, respectively, and bus-communication processing units B1 to B3 that have functions of transmitting and receiving necessary data among the units via the bus communication line L1, respectively. The base unit 15 includes a communication-relay control unit 2 that has a function of transmitting and receiving necessary data among the units.

The synchronous-control signal line L2 can transmit the synchronous control signal with a constant period for enabling synchronous control from a clock generating unit 3 or the like, so that the programmable controller 1 can execute synchronous control with the constant period. Moreover, the programmable controller 1 can also execute synchronous control with an arbitrary period. When the programmable controller 1 executes synchronous control with an arbitrary period, for example, as illustrated in FIG. 1, the input unit 13 receives the arbitrary signal waveform S1 input from the external device 21 and supplies the arbitrary signal waveform S1 as the synchronous control signal directly to the synchronous-control signal line L2 of the base unit 15. Alternatively, as illustrated in FIG. 2, a synchronous-signal generating unit 4 included in the input unit 13 can generate the synchronous control signal on the basis of the received arbitrary signal waveform S1 and supply the synchronous control signal to the synchronous-control signal line L2.

The counter unit 12 latches the current count value, which is an integrated value of the number of pulses S2 input from the external device 22, at the timing of a falling edge of the synchronous control signal passing through the synchronous-control signal line L2, and holds the current count value in an internal memory M1 for one synchronous control period. In this example, one synchronous control period refers to one period of the synchronous control signal (from rising edge to rising edge or falling edge to falling edge of pulses). The external device 21 generating the arbitrary signal waveform S1 and the external device 22 generating the pulse S2 can be different or the same. Examples of cases where the external device 21 and the external device 22 are different include a case where respective operations for two workpieces need to be synchronized.

Meanwhile, the CPU unit 11, which has a processor P1 incorporated therein, starts to execute a program at the timing of a falling edge of the synchronous control signal passing through the synchronous-control signal line L2 and obtains the current count value latched in the internal memory M1 of the counter unit 12 via the bus communication line L1. That is, the CPU unit 11 reads the current count value of the counter unit 12. More specifically, the CPU unit 11 obtains the current count value from the internal memory M1 via the bus-communication processing unit B2, the bus communication line L1, the communication-relay control unit 2, the bus communication line L1, and the bus-communication processing unit B1.

With this configuration, the timing at which the counter unit 12 latches the current count value can be synchronized with the timing at which the CPU unit 11 executes a program, so that the count value with a constant period can be obtained. An error in a count value caused by a variation in timings at which an instruction in a program is executed can be thereby eliminated and thus count information can be obtained with high accuracy.

The programmable controller 1 can execute synchronous control with an arbitrary period as described above. When synchronous control is executed with a constant period, the CPU unit 11 or the clock generating unit 3 transmits the synchronous control signal with the constant period to the synchronous-control signal line L2 of the base unit 15 and then the entire system operates synchronously with the synchronous control signal.

Second Embodiment

Figure 3:
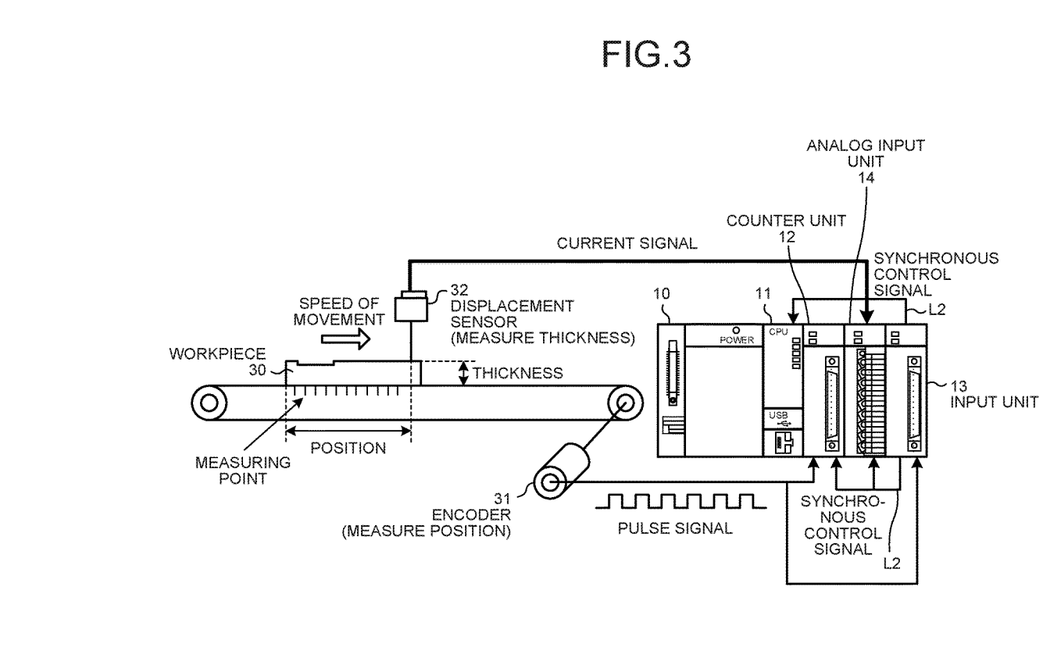
FIG. 3 is a diagram illustrating a configuration of a programmable controller according to a second embodiment.

In a second embodiment, a programmable controller 10 is described as a specific application example of the programmable controller 1 described in the first embodiment. FIG. 3 is a diagram illustrating a configuration of the programmable controller 10 according to the second embodiment.

As illustrated in FIG. 3, the programmable controller 10 includes: the CPU unit 11; the counter unit 12, which holds data therein; the input unit 13, which generates a synchronous control signal; an analog input unit 14, which holds data therein; and the base unit 15 (not illustrated in FIG. 3). That is, the programmable controller 10 of the present embodiment includes, as a data holding unit, the analog input unit 14 in addition to the counter unit 12.

A pulse signal output from an encoder 31 or the like measuring the position of a workpiece 30 according to the amount of movement of the workpiece 30 is input to the input unit 13. For example, the pulse signal is the signal in which the occurrence frequency of a pulse increases or decreases according to the amount of movement of the workpiece 30. The pulse signal from the encoder 31 is input also to the counter unit 12. That is, the present embodiment is a case where the external device 21 and the external device 22 in the first embodiment are the same. A current signal that is an analog signal is input to the analog input unit 14 from a displacement sensor 32 measuring the thickness of the workpiece 30. The current signal is, for example, the amount of current reflecting the thickness of the workpiece 30.

Figure 4:
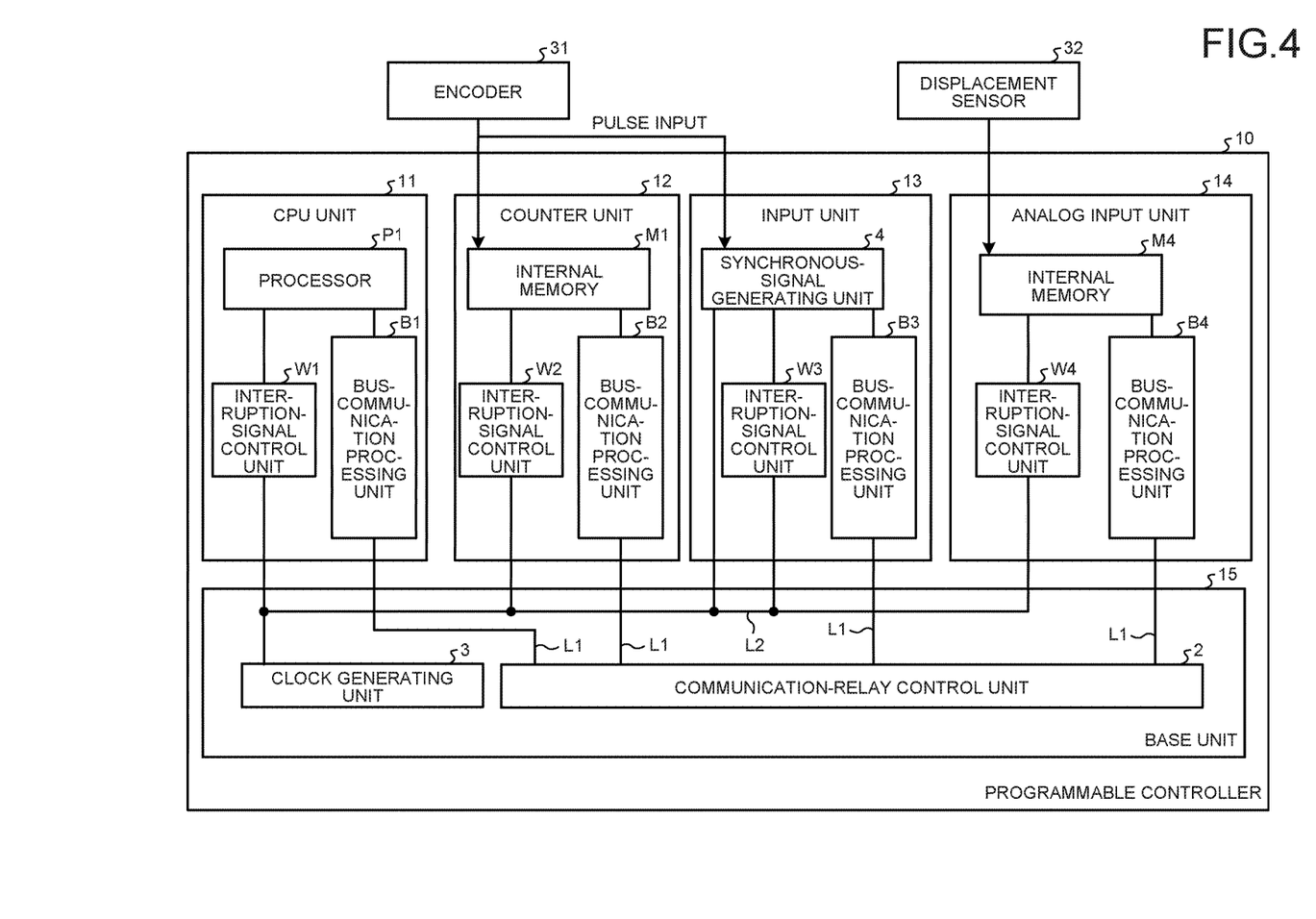
FIG. 4 is a block diagram illustrating a detailed configuration of the programmable controller according to the second embodiment.

FIG. 4 is a block diagram illustrating a detailed configuration of the programmable controller 10 according to the second embodiment. As described above, the programmable controller 10 includes the CPU unit 11, the counter unit 12, the input unit 13, the analog input unit 14, and the base unit 15.

The basic configuration of the programmable controller 10 in FIG. 4 is identical to that of the programmable controller 1 in FIG. 2. However, in the programmable controller 10, signals input from an external source to the counter unit 12 and the input unit 13 are both pulse signals from the encoder 31, and the programmable controller 10 is additionally provided with the analog input unit 14. Similarly to the counter unit 12, the analog input unit 14 includes an internal memory M4, an interruption-signal control unit W4, and a bus-communication processing unit B4. The current signal from the displacement sensor 32 is input to the internal memory M4. The interruption-signal control unit W4 has a function of receiving the synchronous control signal via the synchronous-control signal line L2. The bus-communication processing unit B4 has a function of transmitting and receiving necessary data among the units via the bus-communication line L1.

Figure 5:
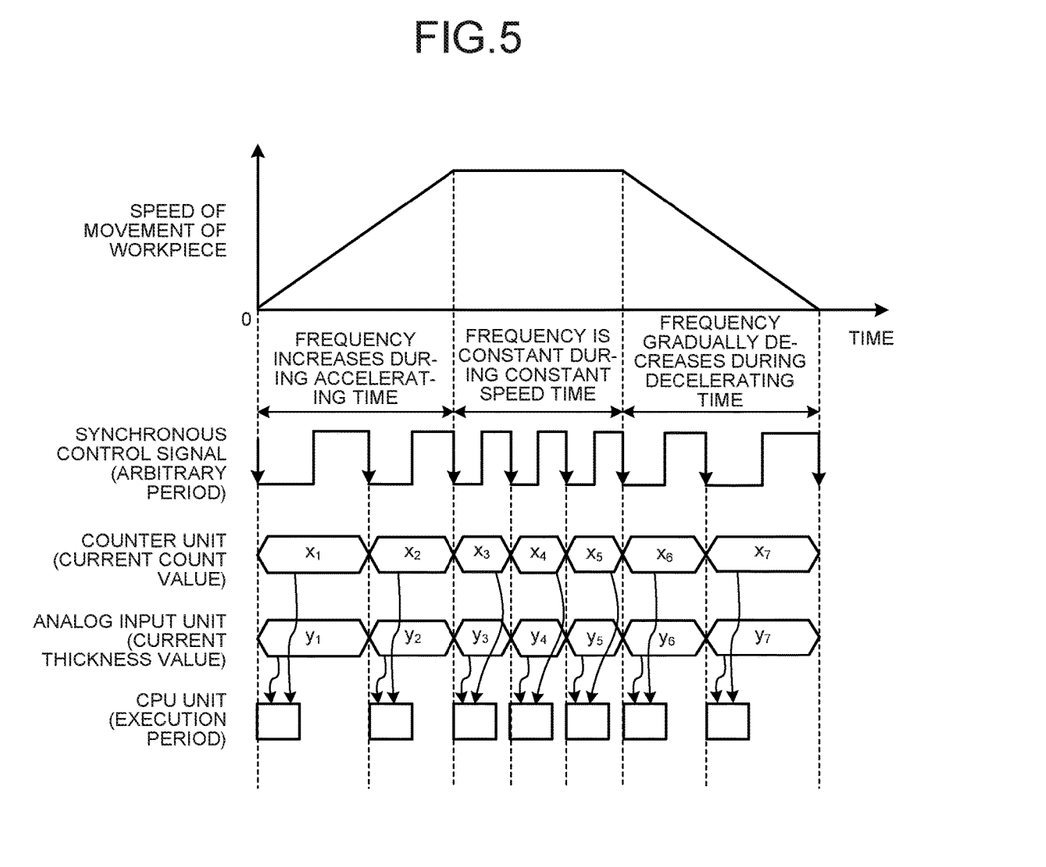
FIG. 5 is a timing chart of the programmable controller according to the second embodiment.

FIG. 5 is a timing chart when synchronous control is executed with an arbitrary period in the programmable controller illustrated in FIG. 3. FIG. 5 illustrates a situation where the speed of movement of the workpiece 30 gradually increases to a constant speed, is kept at the constant speed for a while, and is then gradually decreased. The CPU unit 11 reads the current count value of the counter unit 12 and the current thickness value of the analog input unit 14 with the use of a program instruction. The current thickness value is a thickness value input from the displacement sensor 32 to the analog input unit 14. In respective periods in FIG. 5, the widths in the time direction illustrated in "CPU UNIT (EXECUTION PERIOD)" represent execution periods of the CPU. The widths are the same because the execution period takes substantially the same time during every scanning. For example, when the pulse signal from the encoder 31 has a frequency that is proportional to the speed of movement of the workpiece 30, the input unit 13 supplies the pulse signal from the encoder 31 as the synchronous control signal directly to the synchronous-control signal line L2. Alternatively, the synchronous-signal generating unit 4 of the input unit 13 can generate a synchronous control signal having a frequency that is proportional to the speed of movement of the workpiece 30 on the basis of the pulse signal from the encoder 31 and supply the synchronous control signal to the synchronous-control signal line L2.

For example, as illustrated in FIG. 5, the synchronous control signal is a signal with a rectangular pulse train having a variable time width. As the speed of movement of the workpiece 30 gradually increases, the frequency of the synchronous control signal becomes higher in proportion to the speed of movement. When the speed of movement of the workpiece 30 is constant, the frequency of the synchronous control signal is kept constant. As the speed of movement of the workpiece 30 gradually decreases, the frequency of the synchronous control signal becomes lower in proportion to the speed of movement.

As illustrated in FIG. 5, at the timing of a falling edge of the synchronous control signal, the counter unit 12 latches the current count value ($x_1$ to $x_7$) in the internal memory M1 for one synchronous control period. At the timing of a falling edge of the synchronous control signal, the analog input unit 14 latches the current thickness value (an analog value) ($y_1$ to $y_7$) in the internal memory M4 for one synchronous control period.

Meanwhile, at the timing of a falling edge of the synchronous control signal, the CPU unit 11 starts to execute a program and reads the value in the internal memory M1 of the counter unit 12 and the value in the internal memory M4 of the analog input unit 14 through the bus communication line L1. The thickness of the workpiece 30 at the current position can be thereby obtained with high accuracy. That is, a pulse signal having a frequency that is proportional to the speed of movement of the workpiece 30 is supplied to the synchronous-control signal line L2 as the synchronous control signal, so that even when the speed of movement of the workpiece is not constant, position information (the current count value of the counter unit 12) and the thickness (the current thickness value of the analog input unit 14) at the same timing can be obtained. Consequently, the thicknesses at evenly spaced positions of the workpiece 30 in the moving direction can be obtained.

As described above, the programmable controller according to the present embodiment uses an arbitrary external input signal in addition to the synchronous control signal with a constant period. At the timing at which the counter unit (the data holding unit) synchronizes with the synchronous control signal, the current count value is latched for one synchronization period, and the timing when the CPU unit synchronizes with the synchronous control signal is set as the timing for starting the execution of a program, so that the control timing of the entire programmable controller can be caused to correspond to an arbitrary period that is given from an external source. In the programmable controller according to the present embodiment, because an arbitrary external signal can be used as the synchronous control signal, fine control that cannot be realized by a programmable controller using only a signal with a constant period as the synchronous control signal can be realized.

Furthermore, the invention of the present application is not limited to the above embodiments and can be variously modified at the execution stage without departing from the scope thereof. Moreover, the above-described embodiments include inventions in various stages and various inventions can be extracted by appropriately combining a plurality of disclosed components. For example, even if some of the components are omitted from all the components illustrated in the embodiments, the configuration in which some components are omitted can be extracted as an invention as long as the problems described in the section of Technical Problem can be solved and the effects described in the section of Advantageous Effects of Invention can be obtained. Furthermore, the components in different embodiments may be appropriately combined.

INDUSTRIAL APPLICABILITY

As described above, the programmable controller according to the present invention is useful for control, for example, in processing a workpiece and is particularly, suitable for measuring the thicknesses at evenly spaced positions of a workpiece in the moving direction, for example, when the speed of movement of the workpiece varies.

REFERENCE SIGNS LIST 1, 10 programmable controller, 2 communication-relay control unit, 3 clock generating unit, 4 synchronous-signal generating unit, 11 CPU unit, 12 counter unit, 13 input unit, 14 analog input unit, 15 base unit, 21, 22 external device, 30 workpiece, 31 encoder, 32 displacement sensor, K1 to K3 connector, W1 to W4 interruption-signal control unit, S1 signal waveform, S2 pulse, L1 bus communication line, L2 synchronous-control signal line, B1 to B4 bus-communication processing unit, P1 processor, M1, M4 internal memory.

The invention claimed is:

1. A programmable controller comprising:

a bus for data transmission and reception;

a synchronous-control signal line that transmits a synchronous control signal;

a synchronous-control-signal generating unit that is connected to the synchronous-control signal line and generates the synchronous control signal whose period changes such that a frequency is proportional to a speed of movement of a moving workpiece, on a basis of a variable pulse signal from an encoder measuring a position of the workpiece;

a counter unit that is connected to the bus and the synchronous-control signal line and latches, in a first internal memory, a count value obtained by counting a pulse, number of which is proportional to an amount of movement of the workpiece, on a basis of the pulse signal from the encoder at a timing synchronized with the synchronous control signal;

an analog input unit that is connected to the bus and the synchronous-control signal line and latches, in a second internal memory, an analog signal that is a measurement result of a sensor measuring a thickness of the moving workpiece at a timing synchronized with the synchronous control signal; and a CPU unit that is connected to the bus and the synchronous-control signal line and reads a value in the first and second internal memories via the bus in synchronization with the synchronous control signal.

2. The programmable controller according to claim 1, wherein a signal with a constant period generated by the CPU unit is used as the synchronous control signal.

3. The programmable controller according to claim 1, wherein the counter unit and the analog input unit perform latching at a timing of a falling edge of the synchronous control signal and holds a same value for one period of the synchronous control signal.

* * * * *